United States Patent
Kraus et al.

(10) Patent No.: US 10,087,662 B2
(45) Date of Patent: Oct. 2, 2018

(54) VEHICLE DOOR POWER LOCK ACTUATOR

(71) Applicant: TriMark Corporation, New Hampton, IA (US)

(72) Inventors: Jason J. Kraus, Nashua, IA (US); Eric Wickstrom, Charles City, IA (US)

(73) Assignee: TriMark Corporation, New Hampton, IA (US)

(*) Notice: Subject to any disclaimer, the term of this patent is extended or adjusted under 35 U.S.C. 154(b) by 362 days.

(21) Appl. No.: 14/628,442

(22) Filed: Feb. 23, 2015

(65) Prior Publication Data

US 2016/0244998 A1 Aug. 25, 2016

(51) Int. Cl.
| | |
|---|---|
| E05B 81/06 | (2014.01) |
| E05B 81/46 | (2014.01) |
| F16D 43/18 | (2006.01) |
| E05B 81/34 | (2014.01) |
| F16D 5/00 | (2006.01) |
| E05B 81/24 | (2014.01) |
| E05B 47/00 | (2006.01) |

(52) U.S. Cl.
CPC .............. *E05B 81/06* (2013.01); *E05B 81/25* (2013.01); *E05B 81/34* (2013.01); *E05B 81/46* (2013.01); *F16D 5/00* (2013.01); *F16D 43/18* (2013.01); *E05B 2047/0027* (2013.01)

(58) Field of Classification Search
CPC ......... Y10T 292/1021; Y10T 292/1082; Y10T 292/1018; Y10T 70/7113; Y10T 292/699; Y10T 70/7051; Y10T 70/7062; Y10T 74/18792; Y10T 292/1079; Y10T 70/5889; E05B 81/06; E05B 47/0012; E05B 81/34

USPC ............... 292/138, 142, 160, 172, 155
See application file for complete search history.

(56) References Cited

U.S. PATENT DOCUMENTS

| | | | |
|---|---|---|---|
| 4,616,527 A | * | 10/1986 | Frey ..................... E05B 81/25 74/405 |
| 4,645,050 A | | 2/1987 | Ingenhoven |
| 4,706,512 A | | 11/1987 | McKernon |
| 4,850,466 A | | 7/1989 | Rogakos et al. |
| 4,926,986 A | | 5/1990 | Noel |

(Continued)

FOREIGN PATENT DOCUMENTS

| | | |
|---|---|---|
| DE | 29705380 | 7/1997 |
| EP | 1245763 | 10/2002 |

OTHER PUBLICATIONS

DE 29705380 U1—Hella KG Hueck & Co—English Translation Jul. 24, 1997.

(Continued)

*Primary Examiner* — Mark A Williams
(74) *Attorney, Agent, or Firm* — McKee, Voorhees & Sease, PLC

(57) ABSTRACT

A power lock actuator is provided for a door lock mechanism of a vehicle. The actuator includes an electric motor, a linear drive, and a slip clutch between the motor and the linear drive. The clutch includes a dual-lobe pinion for pulsed energy transmission from the motor to the linear drive, to provide soft starts and stops, which extend the life of the drive assembly 26. The linear drive includes a screw with multiple, discontinuous male thread segments to minimize friction with female threads on the extendible and retractable carriage, thereby minimizing wear between the screw and the carriage.

14 Claims, 19 Drawing Sheets

(56) References Cited

U.S. PATENT DOCUMENTS

| | | | |
|---|---|---|---|
| 4,927,203 A * | 5/1990 | Mayer | E05B 81/25 |
| | | | 292/201 |
| 4,966,266 A | 10/1990 | Yamada et al. | |
| 4,978,155 A | 12/1990 | Kobayashi | |
| 5,056,633 A | 10/1991 | Noel | |
| 5,441,315 A * | 8/1995 | Kleefeldt | E05B 81/25 |
| | | | 292/144 |
| 5,472,065 A | 12/1995 | Vergin | |
| 5,493,881 A | 2/1996 | Harvey | |
| 5,862,903 A | 1/1999 | Gruden et al. | |
| 5,890,393 A | 4/1999 | Ohta | |
| 6,109,124 A | 8/2000 | Chen | |
| 6,557,688 B2 | 5/2003 | Minasian et al. | |
| 2002/0148702 A1* | 10/2002 | Minasian | E05B 81/25 |
| | | | 192/223 |
| 2011/0074168 A1* | 3/2011 | Bendel | E05B 81/20 |
| | | | 292/144 |
| 2012/0313382 A1* | 12/2012 | Lee | E05B 81/06 |
| | | | 292/144 |

OTHER PUBLICATIONS

EP 1 245 763 A1—Hella KG Hueck & Co—English Translation Oct. 2, 2002.

\* cited by examiner

VEHICLE DOOR POWER LOCK ACTUATOR

FIELD OF THE INVENTION

The invention is directed to a linear actuator for a power lock of a vehicle door.

BACKGROUND OF THE INVENTION

Vehicle doors usually have a lock mechanism, which often times is locked and unlocked by an electrically powered actuator. One common design for such power lock actuators is a linear push/pull action for electrically locking and unlocking the door locking mechanism. A typical power lock actuator includes an electrical motor, and a rotary-to-linear transmission mechanism which translates rotary motion from the motor output shaft to a linear motion for locking and unlocking the door lock mechanism. The rotary-to-linear mechanism includes a reversibly rotatable screw and carriage, or a rack and pinion, wherein the motor drives a pinion gear which linearly moves the rack or carriage, which in turn is mechanically coupled to the lock mechanism of the door.

It is customary for motor vehicle doors to be provided with locks having a manual release mechanism inside the vehicle and a key-operated mechanism accessible from outside the vehicle. If the screw/carriage or rack and pinion is directly linked to the locking mechanism, manual operation with a key may be hindered or rendered difficult since the motor has to be back driven. In order to allow back drive, it is known in the industry to provide a clutch mechanism between the electric motor and lock actuator, whereby the clutch couples the motor and actuator only when the motor is energized. When the motor is not energized, the actuator functions independently from the motor. Conventional slip clutch driven actuators for a vehicle door lock typically have a limited life due to the hard start and stop of the clutch engagement, which creates excessive wear on the screw/carriage or rack and pinion assembly. For example, see U.S. Pat. No. 6,109,124.

Accordingly, a primary objective of the present invention is the provision of an improved actuator for a vehicle door lock mechanism having enhanced actuator life.

Another objective of the present invention is the provision of a power lock actuator for a vehicle door lock which provides for soft start and stop functioning of the actuator so as to minimize wear and maximize life of the actuator.

Another objective of the present invention is the provision of a power lock actuator for a vehicle door lock mechanism which allows for actuation in both electrical and manual modes.

A further objective of the present invention is the provision of a power lock actuator for a door lock mechanism which accommodates back drive of the motor.

Still another objective of the present invention is the provision of a power lock actuator for a door lock mechanism having a centrifugal clutch with a dual-lobe drive gear to minimize start and stop loads on the linear actuator.

Yet another objective of the present invention is the provision of a power lock actuator for a door lock mechanism having a centrifugal clutch which pulses energy from the motor to the linear drive.

A further objective of the present invention is the provision of a power lock actuator for a door lock mechanism having a centrifugal clutch which produces a sine wave pulse for the linear actuator.

Another objective of the present invention is the provision of a power lock actuator for a door lock mechanism having minimal friction between the screw shaft and carriage of the actuator.

A further objective of the present invention is the provision of a power lock actuator for a door lock mechanism wherein the screw drive has thread segments only on one half of the shaft for reduced frictional engagement with the threads of the carriage.

Still another objective of the present invention is the provision of a power lock actuator which is economical to manufacture, yet durable and long lasting.

These and other objectives will become apparent from the following description of the invention.

SUMMARY OF THE INVENTION

The power door lock actuator of the present invention has an electric motor coupled to a linear drive actuator movable between extended and retracted positions. A centrifugal clutch is disposed between the motor and the linear drive. The linear drive is coupled to the door lock, such that upon energizing the motor, the linear drive is extended and retracted to lock and unlock the lock mechanism. The clutch has a rotatable dual-lobe drive which minimizes the start and stop loads on the linear drive by pulsing the energy from the motor to the linear drive.

The linear actuator also includes a screw and carriage wherein the screw threads reside only on one-half of the screw shaft. The reduced surface area of the threads minimizes frictional forces between the screw and the carriage for minimized wear, increased efficiency and extended life of the actuator.

DETAILED DESCRIPTION OF THE PREFERRED EMBODIMENTS

Figure 1:
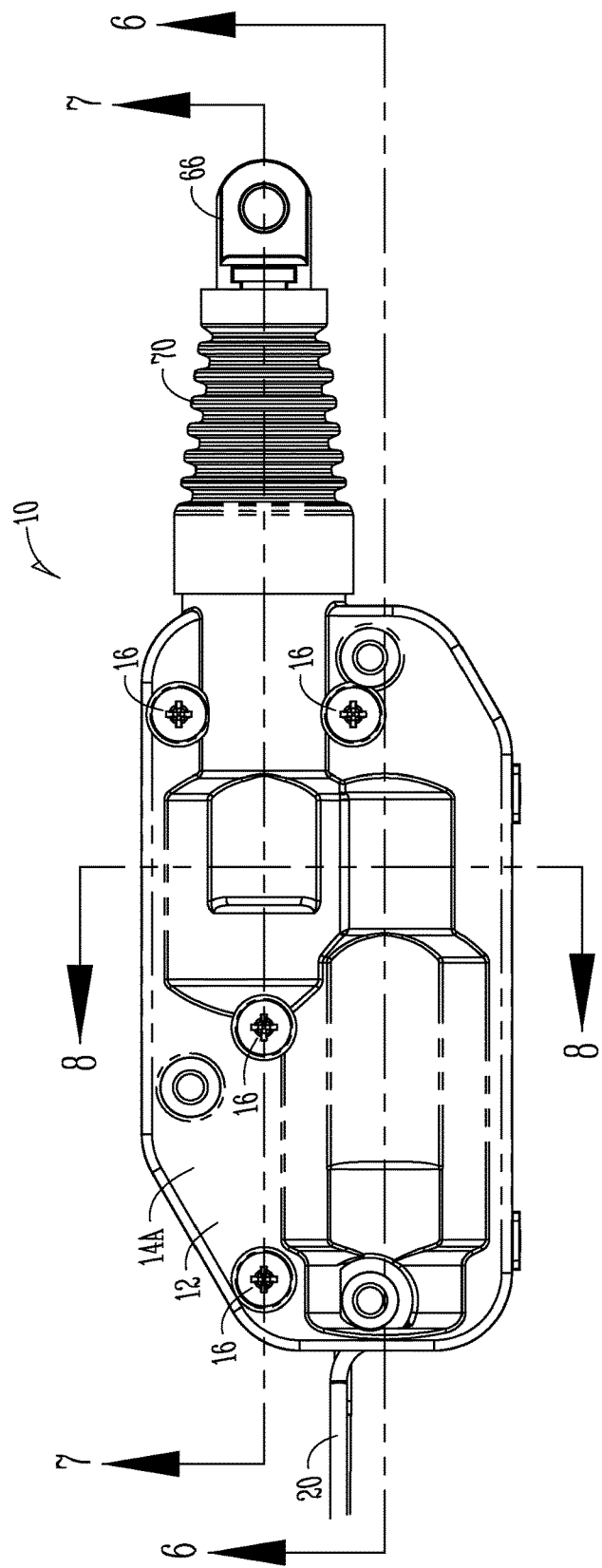
FIG. 1 is a front plan view of the power lock actuator of the present invention.
Figure 2:
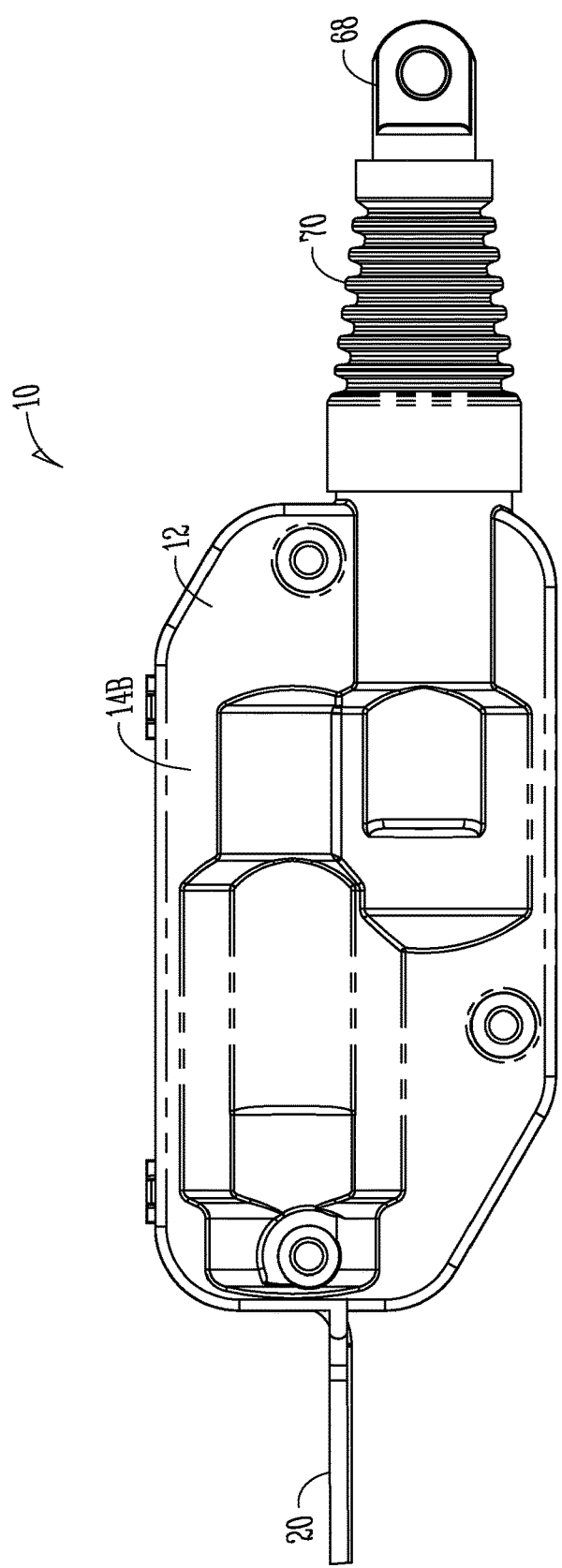
FIG. 2 is a rear plan view of the actuator.
Figure 3:
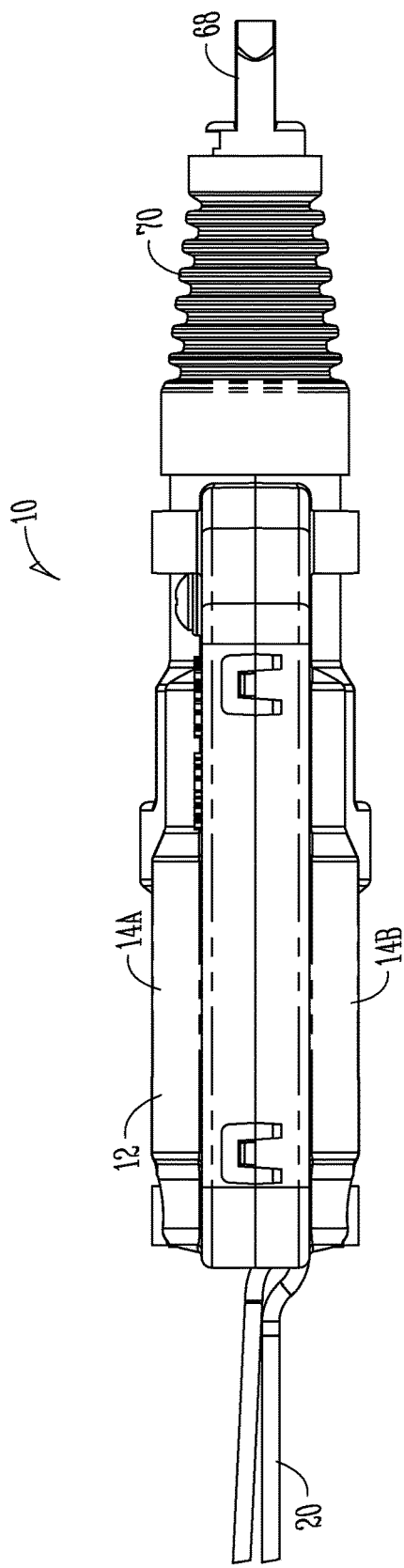
FIG. 3 is a top elevation view of the actuator.
Figure 4:
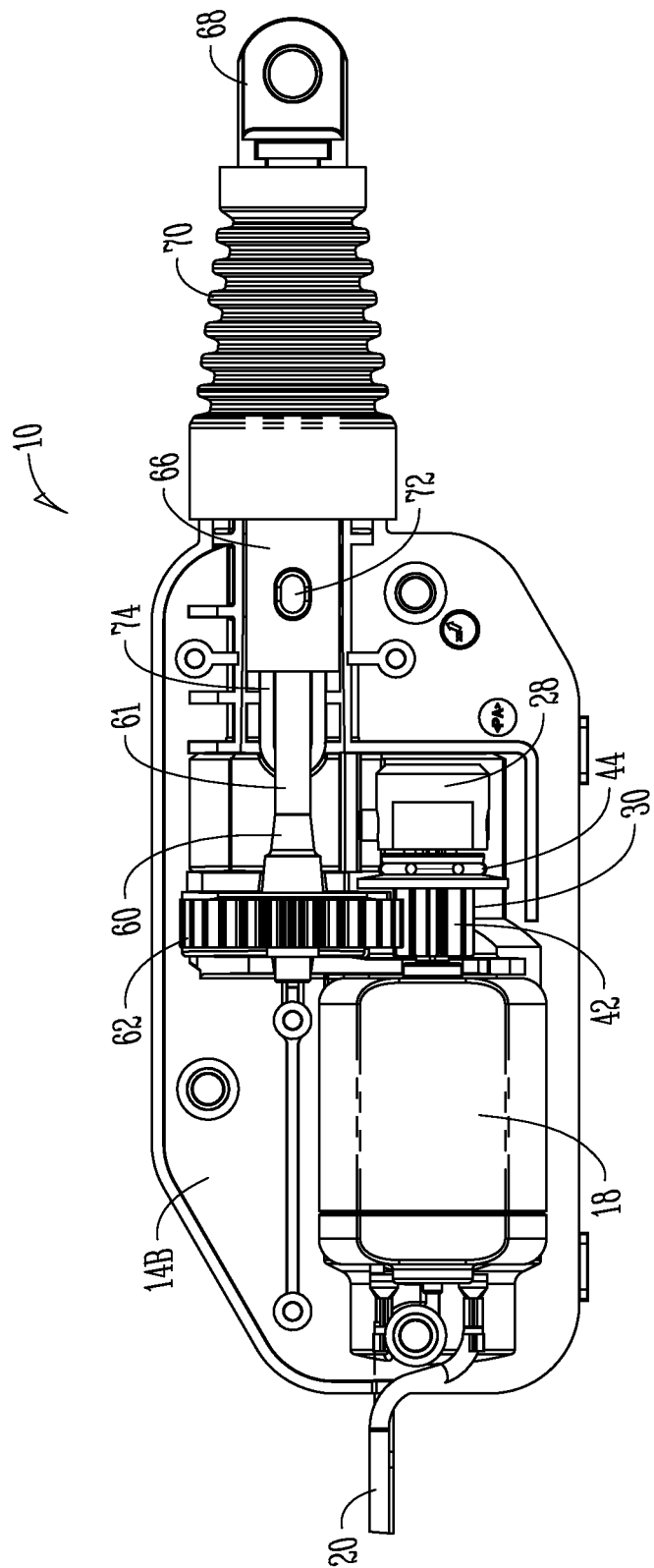
FIG. 4 is a plan view of the actuator with the front casing removed to show in the internal components of the actuator.
Figure 5:
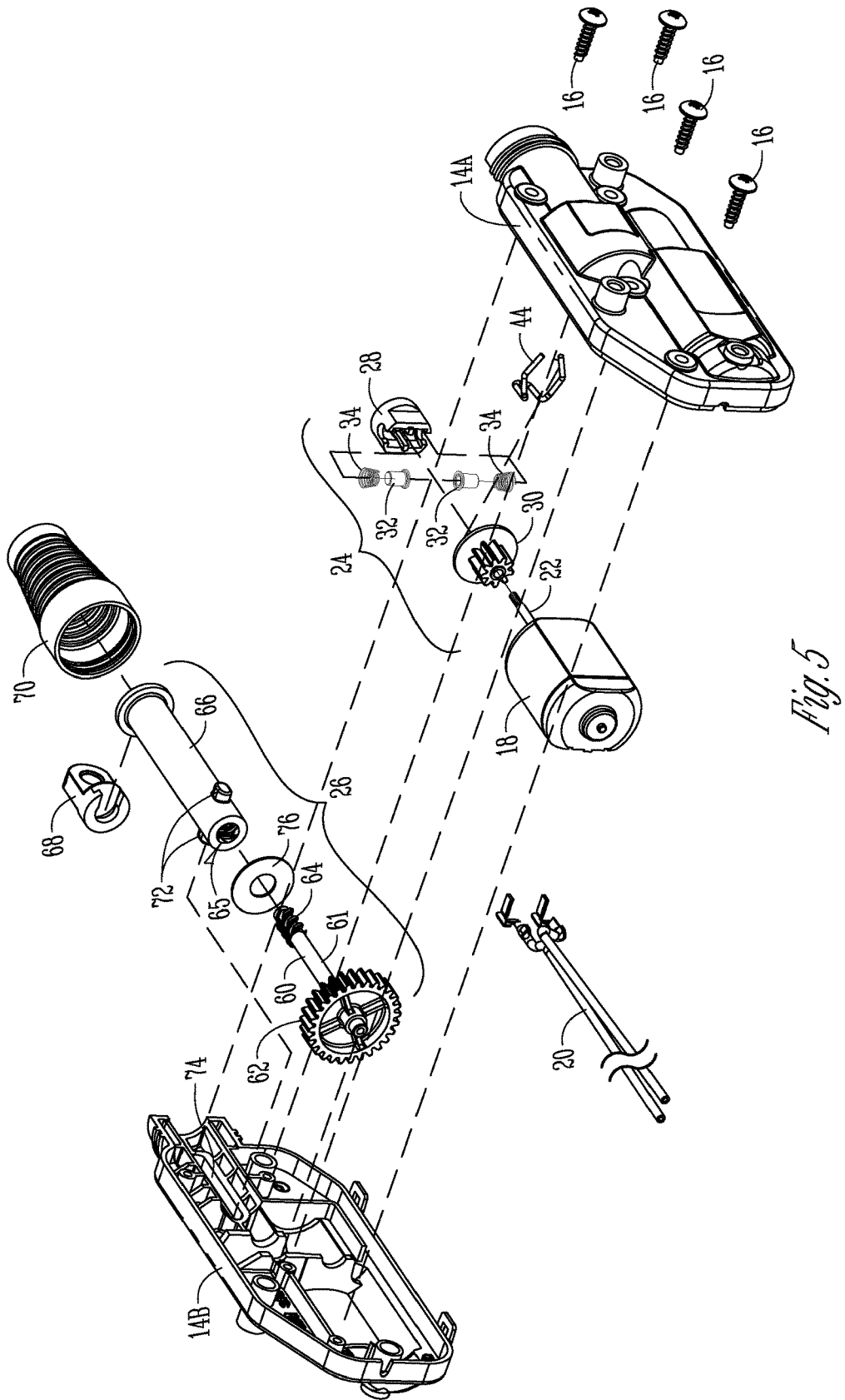
FIG. 5 is an exploded view of the actuator.
Figure 6:
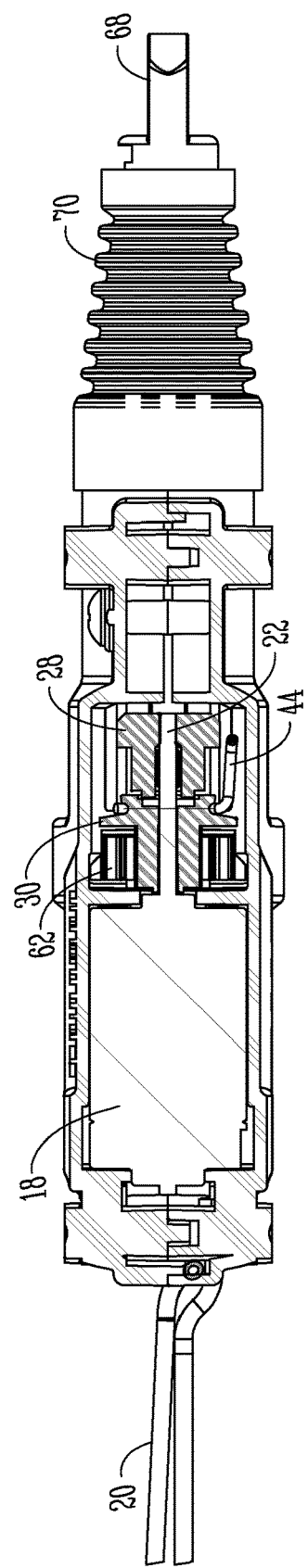
FIG. 6 is a sectional view of the actuator taken along lines 6-6 of FIG. 1.
Figure 7:
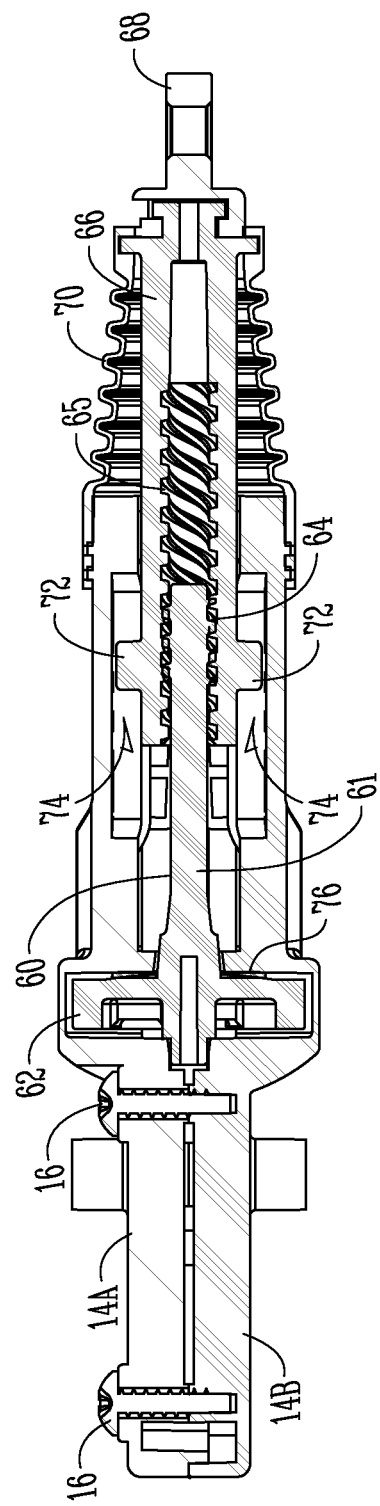
FIG. 7 is a sectional view of the actuator taken along lines 7-7 of FIG. 1.
Figure 8:
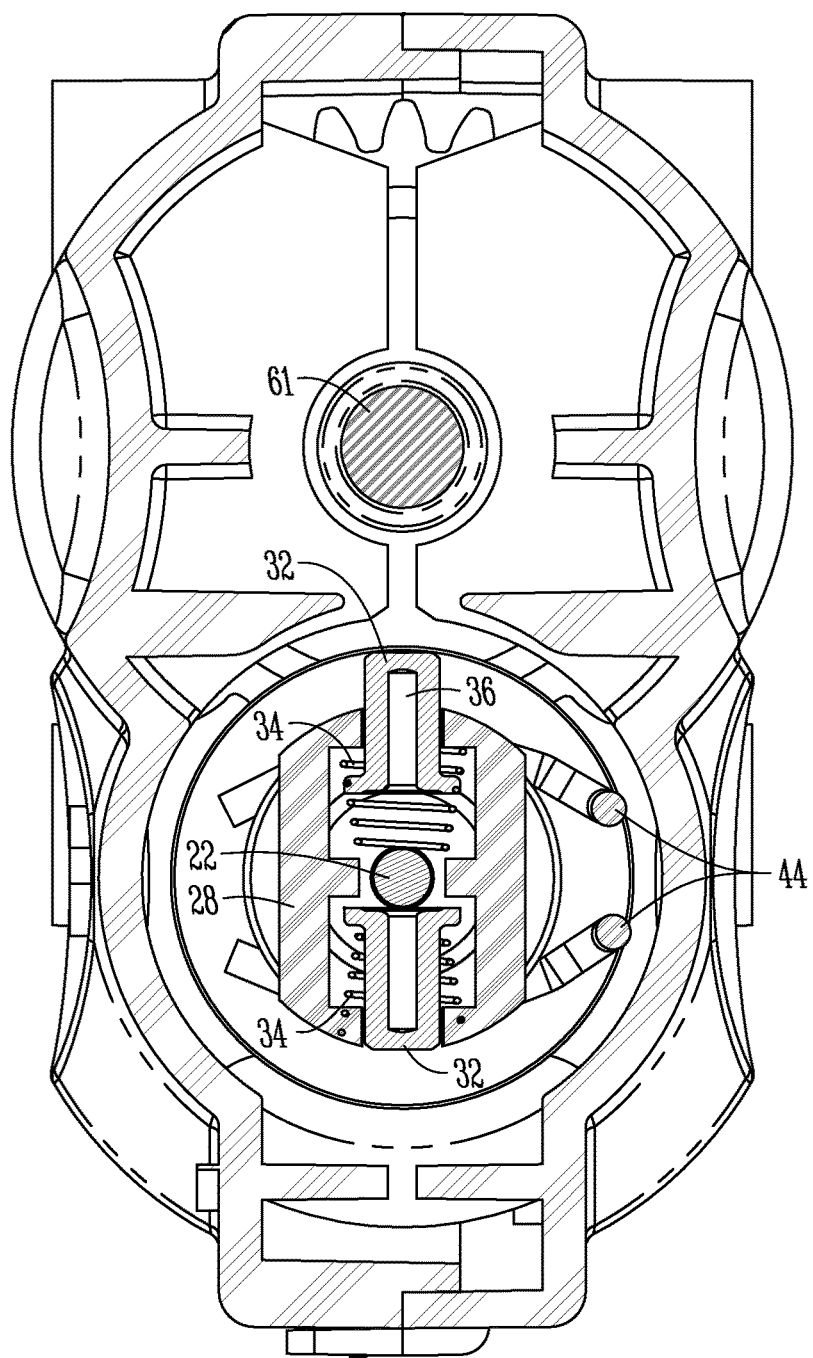
FIG. 8 is a sectional view of the actuator taken along lines 8-8 of FIG. 1.
Figure 9:
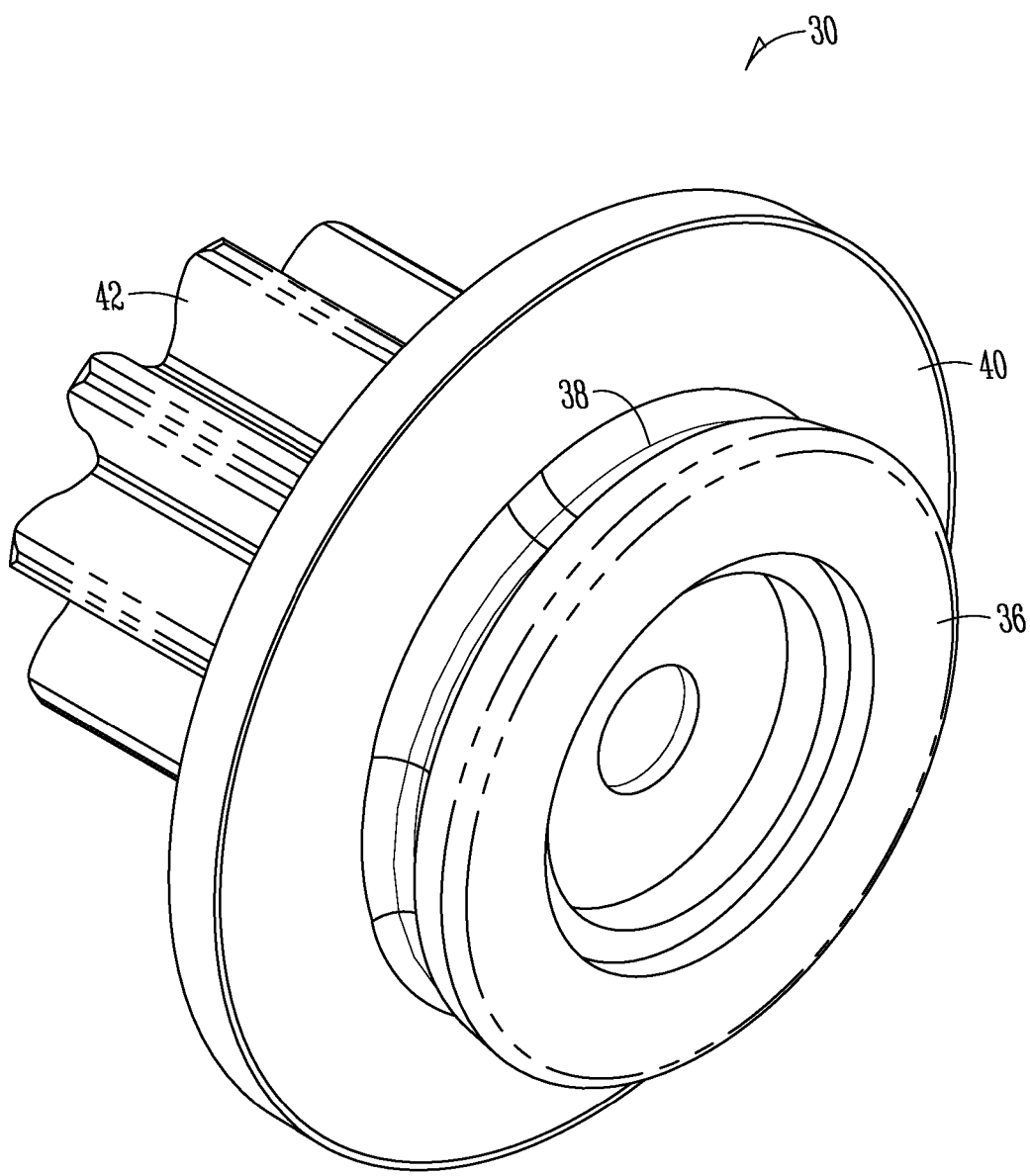
FIG. 9 is a perspective view of the clutch pinion of the actuator.
Figure 10:
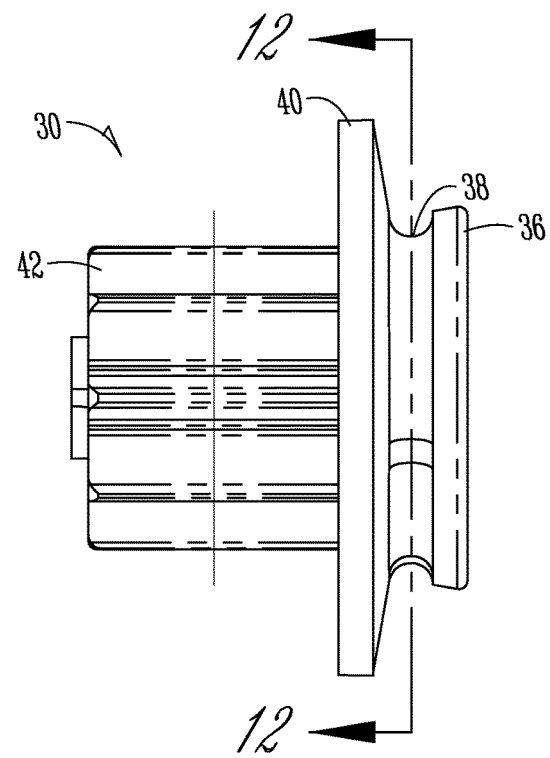
FIG. 10 is a side elevation view of the pinion.
Figure 11:
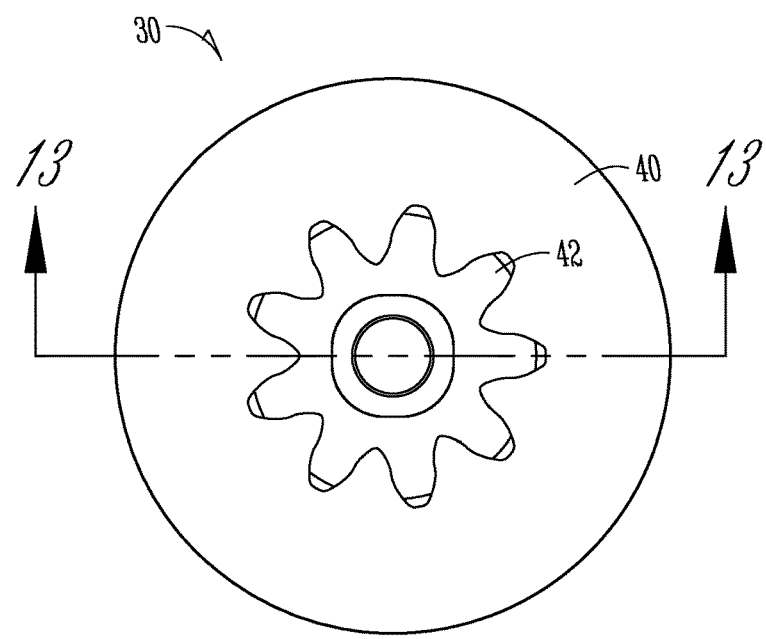
FIG. 11 is an end view of the pinion.

The power lock actuator of the present invention is generally designated by the reference numeral 10 in the drawings. The actuator 10 includes a housing or cover 12, preferably formed in two halves 14A, 14B secured together by snaps and/or fasteners, such as screws 16. A reversible electric motor 18 is mounted in the cover 12 and has a wiring harness 20 operatively connected to the vehicle battery or other electrical power source for energizing the motor 18.

The motor 18 includes a rotatable output shaft 22. A centrifugal clutch assembly 24 is mounted on the shaft 22. A linear drive assembly 26 is coupled to the clutch assembly 24 and to the power lock mechanism (not shown) of the vehicle door. When the motor 18 is energized, the clutch assembly 24 will actuate the linear drive 26 which provides an extension or retraction so as to lock and unlock the door lock mechanism.

The centrifugal clutch assembly 24 includes a hub 28 press fit on the motor shaft 22 and a pinion 30 slip fit on the motor shaft 22. Thus, the hub 28 rotates with the motor shaft 22, while the pinion 30 rotates freely on the motor shaft 22.

The hub 28 includes a pair of drive pins 32 which extend and retract radially relative to the hub 28. Each drive pin 32 is biased by a spring 34 to a radially retracted position. When the motor 18 is energized so as to rotate the shaft 22 and hub 28, the centrifugal force will overcome the bias of the springs 34 so that the drive pins 32 extend radially outwardly.

The pinion 30 includes a head 36, a cam profile 38, an enlarged shoulder 40, and a drive gear 42. An L-shaped wire form or clutch spring 44 has opposing legs 46 to mount the spring 44 onto the cam profile 38 of the pinion 30.

Figure 12:
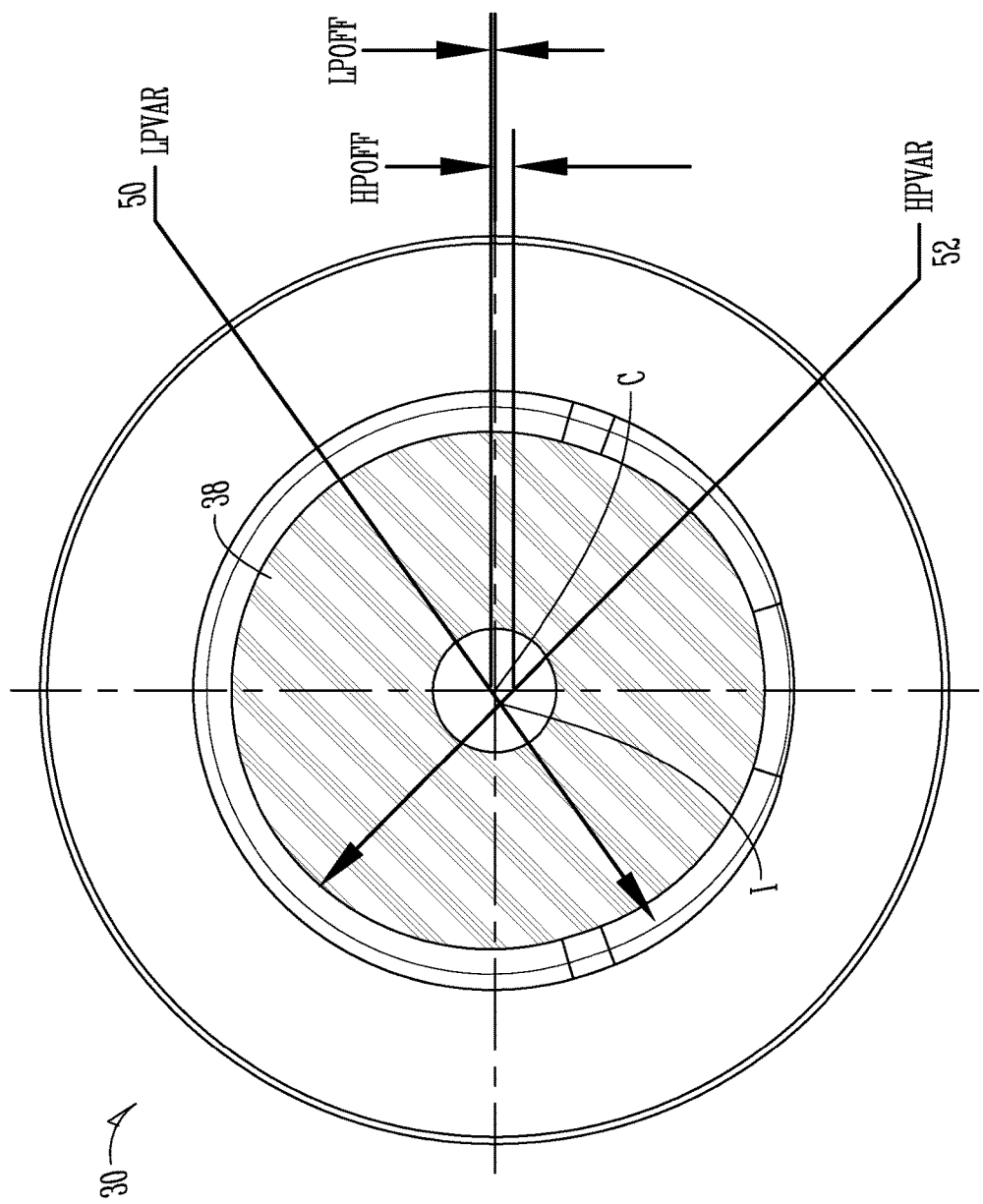
FIG. 12 is a sectional view of the pinion taken along lines 12-12 of FIG. 10.
Figure 13:
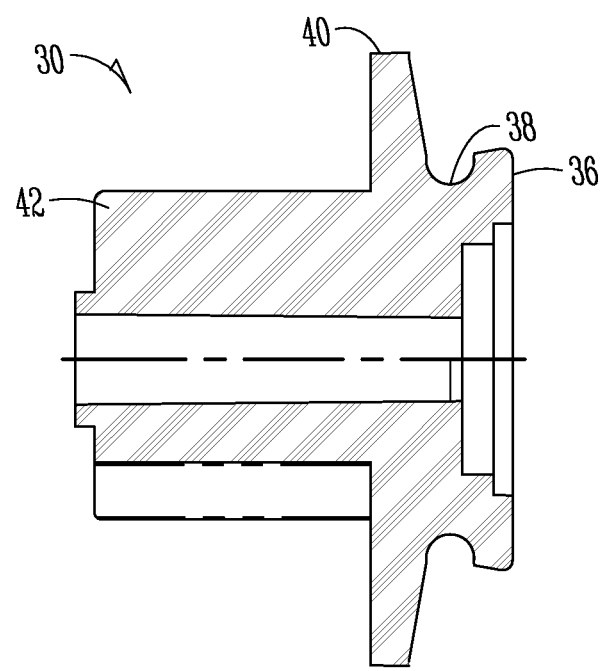
FIG. 13 is a sectional view of the pinion taken along lines 13-13 of FIG. 11.
Figure 14:
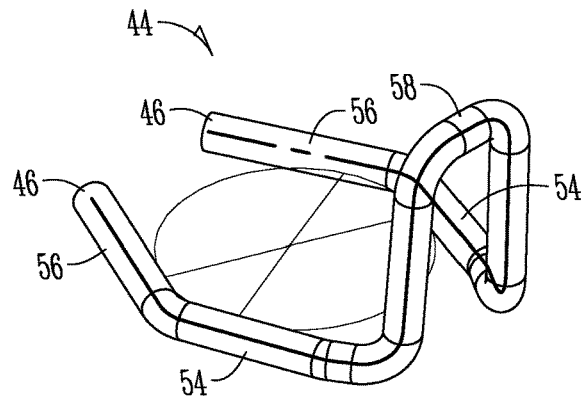
FIG. 14 is a perspective view of the band spring of the clutch.
Figure 15:
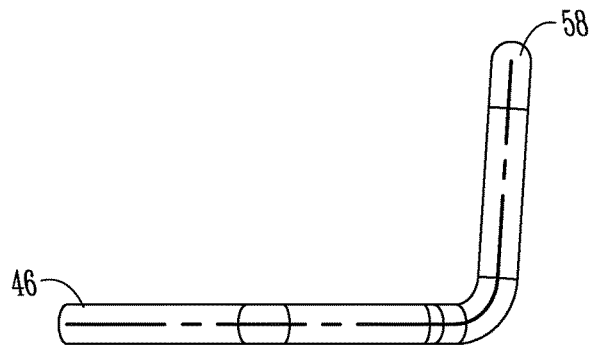
FIG. 15 is a side elevation view of the wire form band spring.
Figure 19:
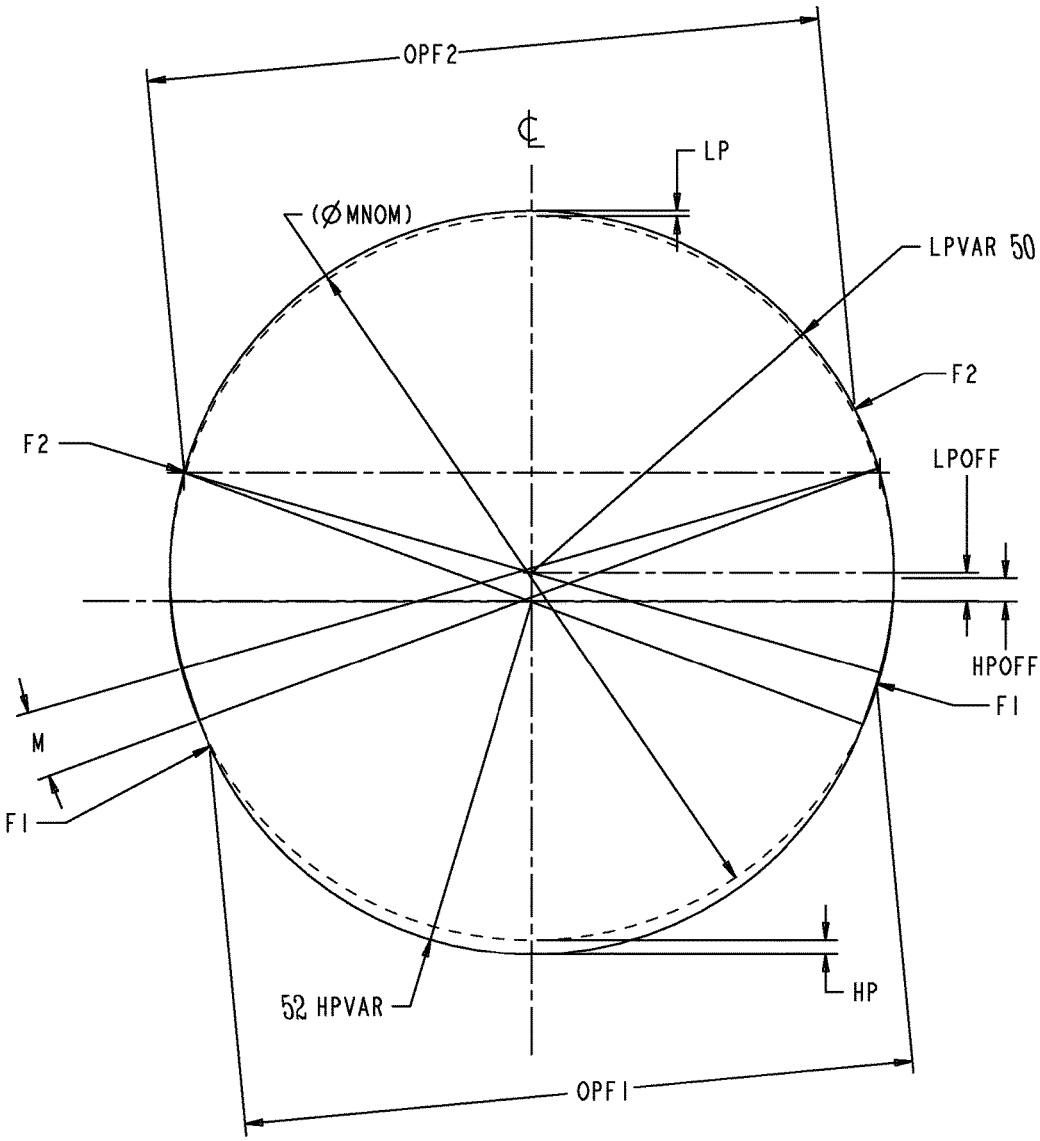
FIG. 19 is a schematic view of the multi-lobe pinion cam profile of the actuator showing the low and high pressure details with a full diameter (shown in hidden lines) as reference.
Figure 20:
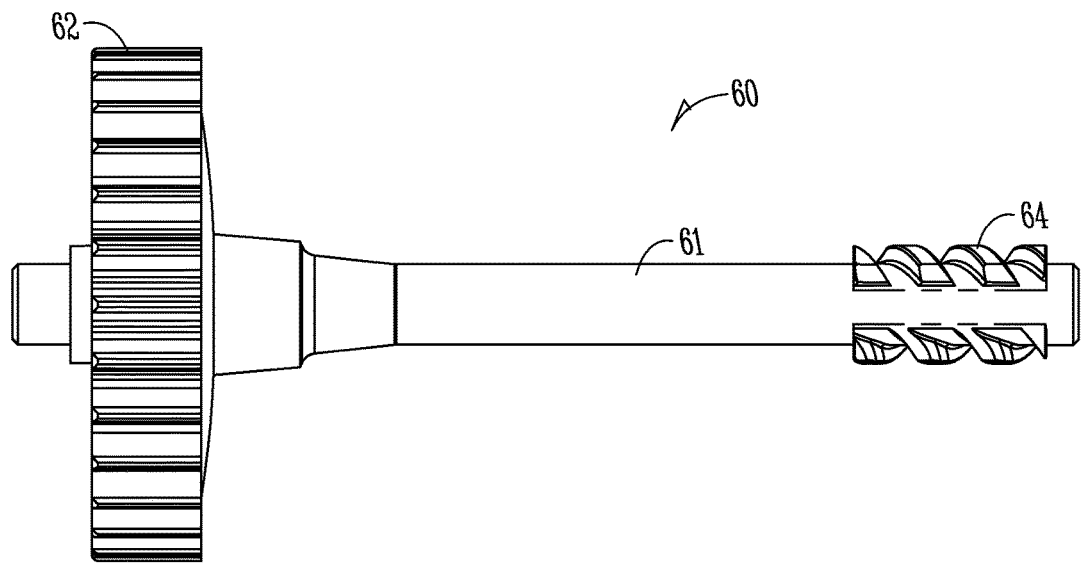
FIG. 20 is a top elevation view of the screw drive of the linear actuator.

The cam profile 38 of the pinion 30 is formed with dual lobes 48 so as form a major axis 50 and a minor axis 52, as best shown in FIGS. 12 and 19. In the preferred embodiment, the cam profile 38 has dual lobes 48 creating a high and low pressure point contact with the clutch spring 44. As shown in FIG. 19, the cam profile is basically an oval with two axes of symmetry; low pressure peak offset (LPOFF) and high pressure peak offset (HPOFF), and is constructed from two arcs; low pressure variable rate lobe curve (LP-VAR) and high pressure variable rate lobe curve (HPVAR). The arcs are joined at a point that is tangential to both arcs and coincides with the full diameter circle as defined as MNOM making the cam profile smooth. M is the dwell point as shown on the high pressure offset side in 2 places and provides part of the transition from the high pressure curve to the full diameter circle (MNON). This cam profile provides low pressure (LP) and high pressure (HP) points that results in 2 variable force differentials (F1) and (F2) that interact with the clutch spring and the frictional interaction between the mating components. These force differentials contact points are shown as OPF1 and OPF2. Also shown is a full diameter circle around the natural center of the pinion 30 and is shown in hidden lines (MNOM) as reference to highlight this cam profile.

Figure 16:
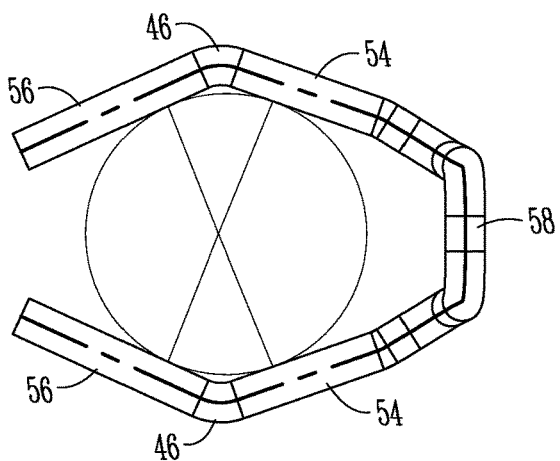
FIG. 16 is a top plan view of the band spring, shown with a schematic full diameter of the cam and the contact points for reference.
Figure 16A:
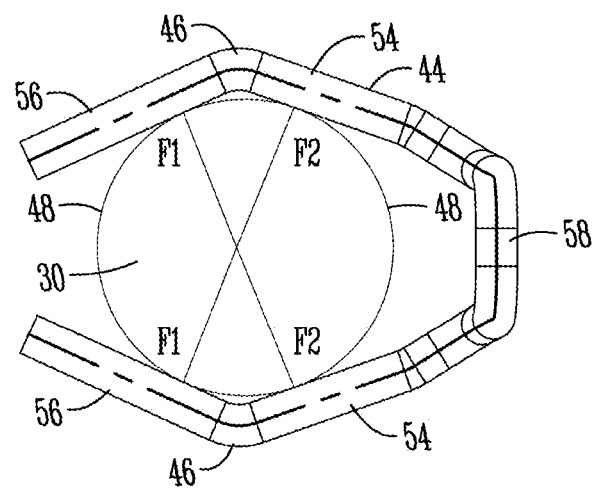
FIG. 16a shows the cam profile oriented with the low pressure contact points F1 at equal and symmetric points at the open end of the clutch spring, which exerts a low output force of the clutch spring.
Figure 16B:
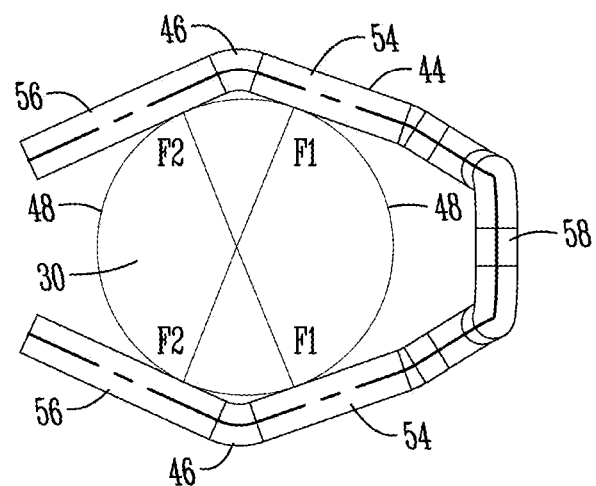
FIG. 16b shows the cam profile oriented with the high pressure contact points F1 at equal and symmetric points at the open end of the clutch spring, which exerts a high output force of the clutch spring.
Figure 17:
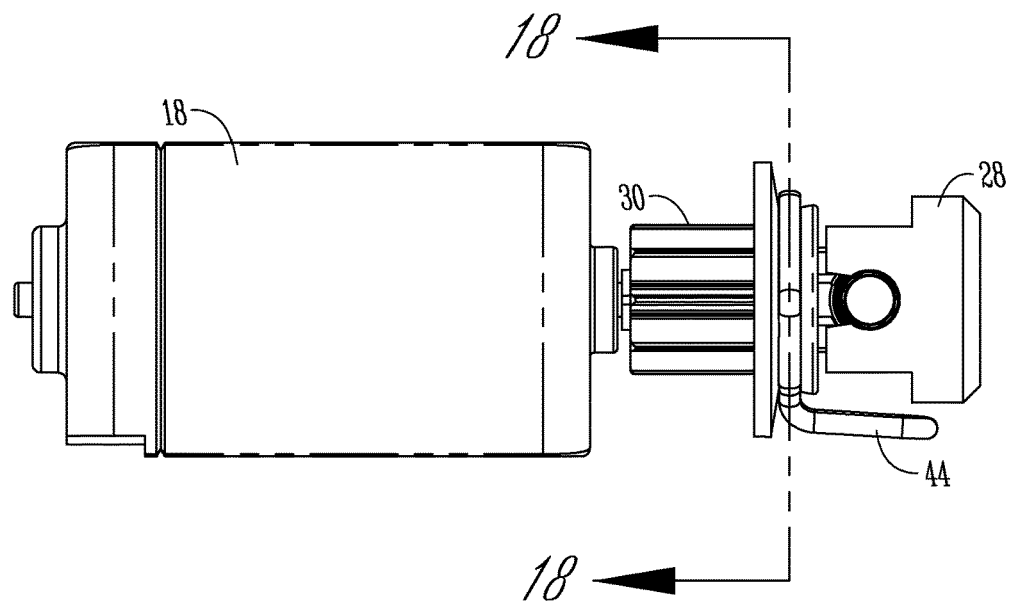
FIG. 17 is a side elevation view of the motor and clutch assembly.
Figure 18:
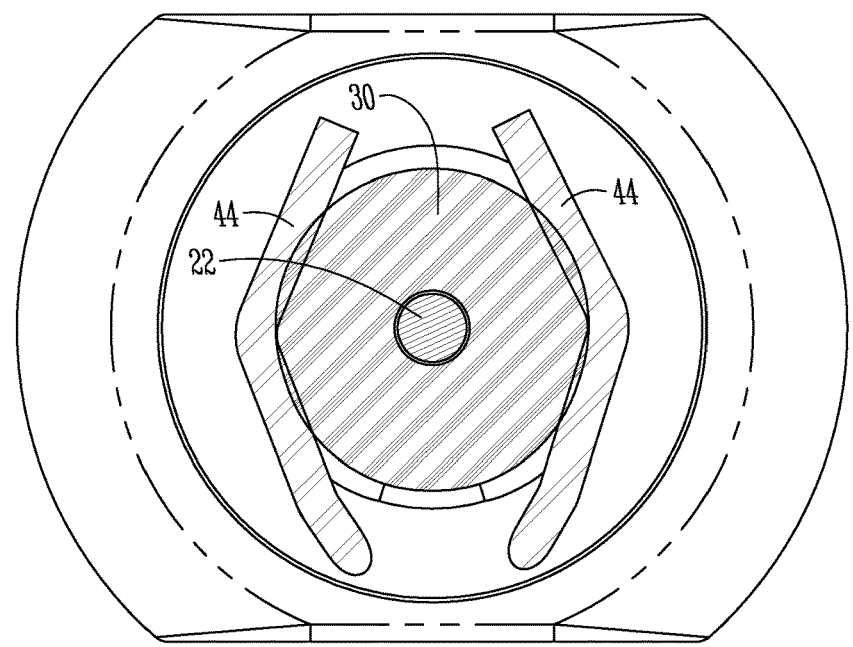
FIG. 18 is a sectional view taken along line 18-18 of FIG. 17.

As best seen in FIG. 16, the legs 46 of the clutch spring 44 each have an inner segment 54 and an outer segment 56 which are angularly disposed with respect to one another. Thus, the clutch spring 44 has four points of contact F1/F2 with the cam profile 38 of the pinion 30 with a different interference fit or frictional force on the segments 54, 56 of each leg 46, due to the different high points of the dual-lobe cam profile 38. The outer ends 56 expand and contract as the pinion 30 rotates. Also, the intersection I of the axes 50, 52 is offset both vertically and horizontally from the center, C, of the pinion 30. See FIG. 12. This interaction between the cam profile 38 and the clutch spring 44 and the low and high pressure points causes the frictional interactions to allow for a sine wave pulsing which provides for soft starts and stops and extends the life of the actuator.

The linear drive 26 includes a screw drive 60 having a driven gear 62 on one end meshing with the drive gear 42 of the pinion 30. The opposite end of the drive screw 60 includes male threads 64 which threadably mesh with female threads on the interior of a carriage 66. The carriage 66 extends outwardly from the cover 12 and terminates in a tip 68 which is operably connected to the lock mechanism (not shown) of the door. A bellows 70 sealingly covers the exposed end of the carriage 66 to preclude foreign material from entering the cover 12.

Figure 21:
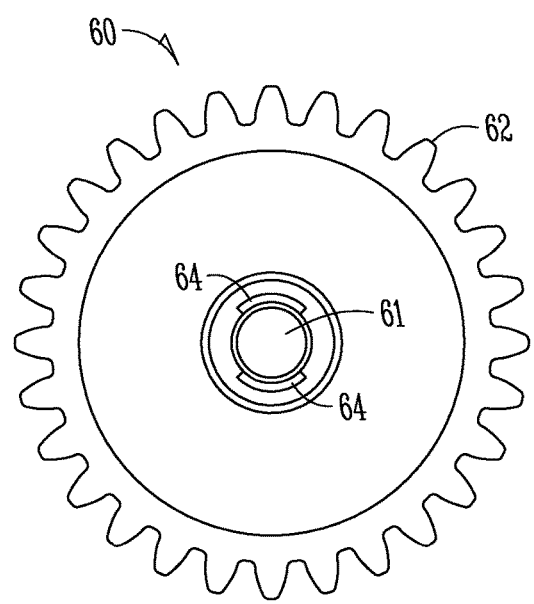
FIG. 21 is an end elevation view of the screw drive.
Figure 22:
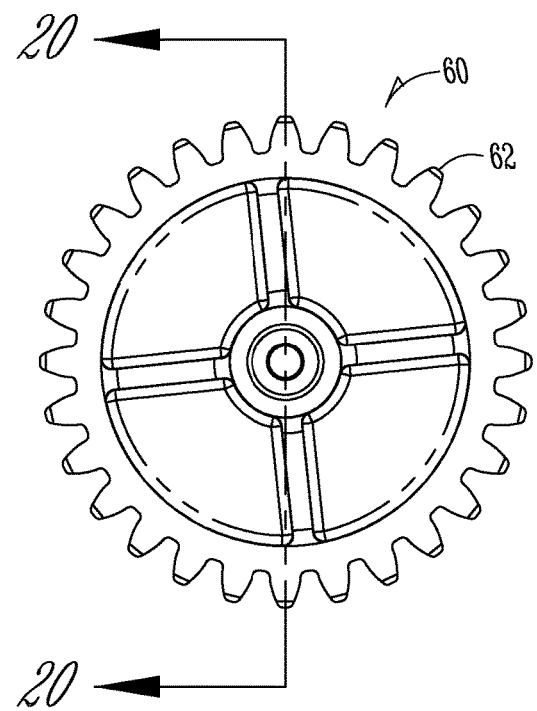
FIG. 22 is an end view of the screw drive from the opposite end of FIG. 18.
Figure 23:
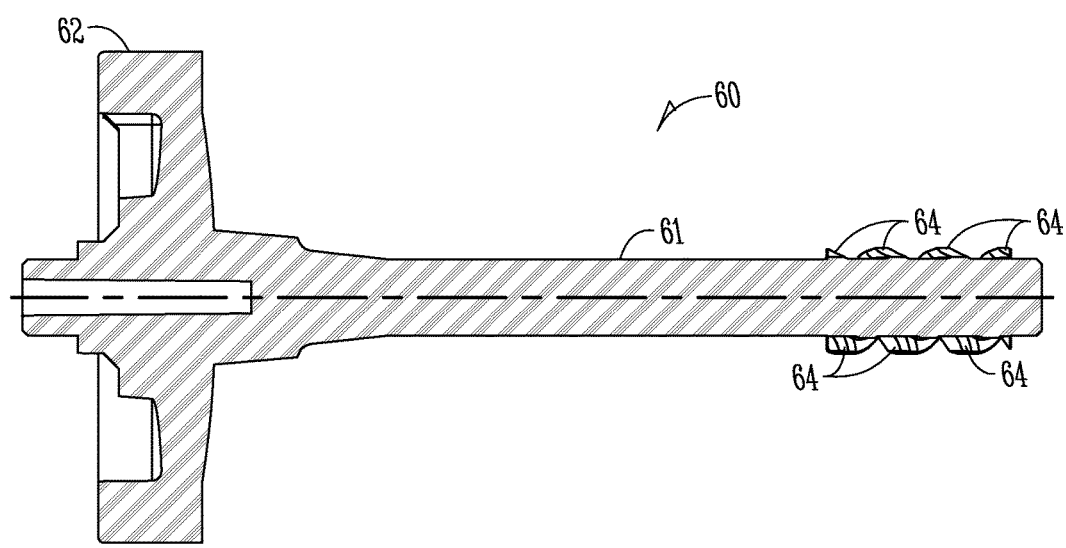
FIG. 23 is a sectional view of the screw drive taken along lines 20-20 of FIG. 22.

In the preferred embodiment, the male threads 64 of the drive screw 60 are discontinuous and only extend approximately 90° on each of the opposite sides of the screw shaft 61. Thus, the threads 64 extend a total of only 180° of the circumference of the shaft 61, as seen in FIG. 21. In comparison, the female threads 65 of the carriage 66 extend 360° around the bore of the carriage 66. The discontinuous segments of the male threads 64 minimize surface area friction with the female threads 65, and thereby reduce wear and extend the life of the linear drive 26. The partial male threads 64 also allow grease to move or flow or move easier around the shaft 61.

The carriage 66 includes a pair of tabs extending radially outwardly into opposite grooves 74 formed in the halves 14A, 14B of the cover 12. The grooves 74 form a track for the carriage tabs 72 as the carriage 66 extends and retracts relative to the cover 12 upon rotation of the screw drive 60 in opposite directions. A thrust washer 76 resides between the inner end of the carriage 66 and the driven gear 62.

When the motor 18 is de-energized, the drive pins 32 are retracted by the springs 34 into the hub 28, and do not engage the spring web 58 of the clutch spring 44. When the motor 18 is energized, the hub 28 initially rotates with the shaft 22 without rotation of the pinion 30. As the motor 18 gets up to speed, centrifugal force pushes the drive pins 32 of the hub 28 outwardly so as to engage the spring web 58 of the clutch spring 44, which in turn, begins to rotate the pinion 30 via the frictional engagement of the spring legs 46 with the pinion cam profile 38. The rotating pinion 30 and dual-lobe cam profile 38 provides pulsed energy in a sine wave pattern, thereby producing a soft start for the linear drive 26. Similarly, when the motor 18 is de-energized and the output shaft 22 begins to slow its rotational velocity, the pinion 30 provides a sine wave pulse for a soft stop of the linear drive 26. When the centrifugal force drops sufficiently, the springs 34 retract the drive pins 32 in the hub 28 so as to disengage the spring legs 46, thereby discontinuing the rotation of the pinion 30 with the hub 28, and stopping the rotation of the drive screw 60 and the associated linear movement of the carriage 66 relative to the screw shaft 61. Rotation of the motor shaft 22 in opposite directions turns the drive screw 60 in opposite directions, and thereby moves the carriage 66 in opposite linear directions to extend and contract thereby locking and unlocking the door.

Because the pinion 30 is slip fit on the motor shaft 22, the power lock actuator can be manually back driven, for example by a key in the lock cylinder of the lock mechanism, so that a person can manually unlock the door from inside or outside the vehicle.

Figure 24:
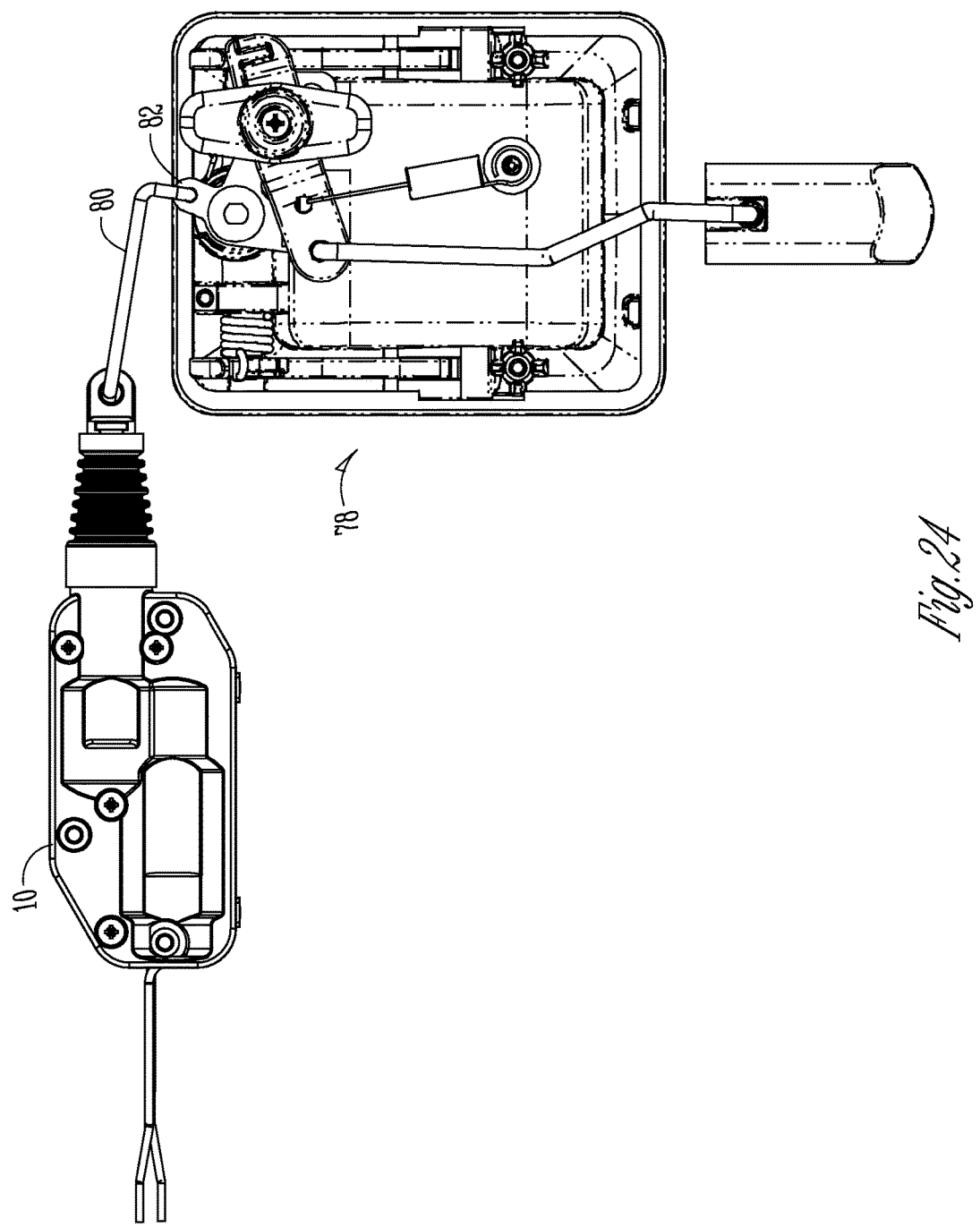
FIG. 24 is a schematic view showing the actuator coupled to a vehicle door handle assembly.

As shown in FIG. 24, the linear actuator 10 is coupled to a vehicle door handle assembly 78 having a lock mechanism. For example, the carriage 66 of the actuator is connected by a rod 80 to a lock cam 82 of the handle assembly 78. As the carriage 66 is extended and retracted by rotation of the screw drive 60, the rod 80 pivots the lock cam to control operation of the handle lock mechanism in a manner similar to that described in co-pending published U.S. Patent Application No. 2012/0272695, incorporated herein by reference.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A door lock actuator for locking and unlocking a vehicle door lock, the door lock actuator comprising:
    a reversible electric motor with a rotatable output shaft;
    a linear drive movable between extended and retracted positions and connected to the door lock;
    a centrifugal clutch on the output shaft and disposed between the motor and the linear drive to move the linear drive to the extended and retracted positions after the motor is turned on to lock and unlock the door respectively; and the centrifugal clutch having a rotatable drive, the rotatable drive provided with an oval shape, the oval shape having a major axis and a minor axis so as to define dual lobes to minimize start and stop loads on the linear drive when the linear drive is moved between the extended and retracted positions.

2. The door lock actuator of claim 1 wherein the drive pulses output force of the clutch from the motor output shaft to the linear drive.

3. The door lock actuator of claim 1 wherein the drive generates high and low force through the clutch for a soft start and stop of the linear drive.

4. The door lock actuator of claim 1 wherein the centrifugal clutch includes a clutch spring mounted on the drive for coupling with the motor output shaft.

5. The door lock actuator of claim 4 wherein the clutch spring engages the dual-lobes at two spaced apart pressure points and the clutch spring has spaced apart opposite ends which expand and retract as the rotatable drive rotates.

6. The door lock actuator of claim 1 wherein the centrifugal clutch includes a pinion slip fit on the motor output shaft, and a hub press fit on the motor output shaft with two extendable and retractable drive pins for coupling with the pinion.

7. The door lock actuator of claim 6 wherein the drive pins are spring biased to the retracted position and centrifugal force overcomes the spring bias to move the drive pins to the extended position.

8. The door lock actuator of claim 1 wherein the door lock actuator can be back driven allowing the linear drive to be freely movable between extended and retracted positions by mechanical force.

9. The door lock actuator of claim 1 wherein each axis has a center point, and the center points being offset with respect a center point of the drive.

10. A door lock actuator for locking and unlocking a door lock, the door lock actuator comprising:
    an electric motor with a rotatable output shaft;
    a linear drive having opposite ends, each of the opposite ends extend and retract relative to one another, with one end being operatively connected to the motor and the other end being connected to the door lock; one of the ends having a drive screw with a plurality of discontinuous male thread segments each having opposite ends; the other end having female threads; the male thread segments each extending radially less than 360° around the drive screw, whereby sequentially adjacent male thread segments have adjacent ends spaced apart from one another, such that surface area friction is minimized.

11. The door lock actuator of claim 10 wherein the male thread segments on the drive screw extend approximately 90° around the shaft in 2 places.

12. The door lock actuator of claim 10 wherein the male thread segments on the drive screw extend only along two sides of the shaft.

13. The door lock actuator of claim 10 wherein the female threads extend 360°.

14. The door lock actuator of claim 10 wherein the discontinuous male thread segments define a channel extending along the shaft between the ends of the male thread segments.

* * * * *